(12) United States Patent
Wang

(10) Patent No.: US 11,762,949 B2
(45) Date of Patent: Sep. 19, 2023

(54) CLASSIFICATION MODEL TRAINING METHOD, SYSTEM, ELECTRONIC DEVICE AND STRORAGE MEDIUM

(71) Applicant: SHANDONG YINGXIN COMPUTER TECHNOLOGIES CO., LTD., Shandong (CN)

(72) Inventor: Gangfeng Wang, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 17/789,392

(22) PCT Filed: Aug. 21, 2020

(86) PCT No.: PCT/CN2020/110361
§ 371 (c)(1),
(2) Date: Jun. 27, 2022

(87) PCT Pub. No.: WO2021/135271
PCT Pub. Date: Jul. 8, 2021

(65) Prior Publication Data
US 2023/0038579 A1 Feb. 9, 2023

(30) Foreign Application Priority Data
Dec. 30, 2019 (CN) .......................... 201911398087.1

(51) Int. Cl.
*G06F 18/214* (2023.01)
(52) U.S. Cl.
CPC .................... *G06F 18/214* (2023.01)
(58) Field of Classification Search
CPC .................................................. G06F 18/214
(Continued)

(56) References Cited

U.S. PATENT DOCUMENTS

2011/0246409 A1 10/2011 Mitra
2014/0032450 A1 1/2014 Lakshminarayan
(Continued)

FOREIGN PATENT DOCUMENTS

CN 107341497 A 11/2017
CN 108596199 A 9/2018
(Continued)

OTHER PUBLICATIONS

Barua, S., Islam, M.M., Murase, K. (2011). A Novel Synthetic Minority Oversampling Technique for Imbalanced Data Set Learning. In: Lu, BL., Zhang, L., Kwok, J. (eds) Neural Information Processing. ICONIP 2011. Lecture Notes in Computer Science, vol. 7063. Springer, Berlin, Heidelberg. (Year: 2011).*
(Continued)

*Primary Examiner* — James D. Rutten
(74) *Attorney, Agent, or Firm* — COOPER LEGAL GROUP, LLC

(57) ABSTRACT

Provided are a classification model training method, system, electronic device, and storage medium. The method includes: determining sampling rates of first-class samples and second-class samples in a data set, and setting the samples with a sampling rate less than a preset value as target samples (S101); determining data distribution feature information of the target samples based on Euclidean distances between all the samples in the data set (S102); wherein the data distribution feature information is information describing the number of same-class samples in nearest neighbor samples, and the nearest neighbor samples are two samples at a Euclidean distance less than a preset distance; generating new samples corresponding to the target samples based on the data distribution feature information (S103); and training the classification model using the
(Continued)

first-class samples, the second-class samples and the new samples (S104).

13 Claims, 3 Drawing Sheets

(58) Field of Classification Search
USPC .......................................................... 717/12
See application file for complete search history.

(56) References Cited

U.S. PATENT DOCUMENTS

| | | | | |
|---|---|---|---|---|
| 2016/0275289 | A1* | 9/2016 | Sethumadhavan | ........................ H04L 63/0428 |
| 2017/0032276 | A1* | 2/2017 | Sukhanov | ............. G06F 16/285 |
| 2019/0244253 | A1* | 8/2019 | Vij | ........................... G06F 40/30 |
| 2021/0287136 | A1* | 9/2021 | Das | ........................ G06N 20/10 |
| 2022/0237407 | A1* | 7/2022 | Umeda | .................. G06N 20/00 |

FOREIGN PATENT DOCUMENTS

| | | | |
|---|---|---|---|
| CN | 108764366 A | 11/2018 | |
| CN | 110163261 A | 8/2019 | |
| CN | 110213222 A | 9/2019 | |
| CN | 110348486 A | 10/2019 | |
| CN | 111178435 A | 5/2020 | |
| EP | 2182458 A1 * | 5/2010 | ........... G06F 21/562 |

OTHER PUBLICATIONS

Beckmann, M., Ebecken, N. and Pires de Lima, B. (2015) A KNN Undersampling Approach for Data Balancing. Journal of Intelligent Learning Systems and Applications, 7, 104-116. doi: 10.4236/jilsa.2015.74010. (Year: 2015).*

Fernández A, Garcia S, Herrera F, Chawla NV. SMOTE for learning from imbalanced data: progress and challenges, marking the 15-year anniversary. Journal of artificial intelligence research. Apr. 20, 2018;61:863-905. (Year: 2018).*

Zhan Shi Jan. 8, 2020 Improving k-Nearest Neighbors Algorithm for Imbalanced Data Classification, IOP Conf. Ser.: Mater. Sci. Eng. 719 012072 (Year: 2020).*

Guan, H., Zhang, Y., Xian, M. et al. SMOTE-WENN: Solving class imbalance and small sample problems by oversampling and distance scaling. Appl Intell 51, 1394-1409 (2021). https://doi.org/10.1007/s10489-020-01852-8 (Year: 2021).*

International Search Report of corresponding PCT application PCT/CN2020/110361, dated Oct. 29, 2020, 6 pages.

Written Opinion of International Searching Authority of corresponding PCT application PCT/CN2020/110361, dated Oct. 29, 2020, 9 pages, No English translation.

Haibo He, et al., "ADASYN Adaptive Synthetic Sampling Approach for Imbalanced Learning", 2008 International Joint Conference on Neural Networks (IJCNN 2008) 2008, 7 pages.

Peng Cao et al., "Multiclass Imbalanced Data Classification Based on Decision Criteria Optimization", Journal of Chinese Computer Systems, 2014, full text with English abstract, 7 pages.

* cited by examiner

CLASSIFICATION MODEL TRAINING METHOD, SYSTEM, ELECTRONIC DEVICE AND STRORAGE MEDIUM

The present application claims priority to Chinese Patent Application No. 201911398087.1, filed to the Patent Office of the People's Republic of China on Dec. 30, 2019, and entitled "Classification Model Training Method, System, Electronic Device and Storage Medium", the contents of which are hereby incorporated by reference in its entirety.

TECHNICAL FIELD

The present application relates to the technical field of machine learning, and particularly to a classification model training method, system, an electronic device and a storage medium.

BACKGROUND ART

A prediction model constructed based on an unbalanced data set would represent a greater tendency to the classes with a large proportion in the data set, resulting in obvious prediction errors. At present, under-sampling or over-sampling is generally used for unbalanced data to balance the unbalanced data. The basic principle of under-sampling is to actively discard data of a class accounting for a relatively large proportion in the unbalanced data set to achieve a balance in class proportion. However, under-sampling may cause data feature losses in most cases, and further causing a preset error of the final prediction model. A conventional over-sampling model usually uses simply data duplication, which may cause data feature offsets, data distribution marginalization aggravation, noise increase and other problems. While the data set may be balanced, this may cause an over-fitted final prediction model and a poor generalization ability.

Therefore, how to balance the numbers of samples of various classes in a data set to improve the prediction accuracy of a classification model is a technical problem urgent to be solved by those skilled in the art at present.

SUMMARY

An objective of the present application is to provide a classification model training method, system, an electronic device and a storage medium, which can balance the numbers of samples of various classes in a data set and improve the prediction accuracy of a classification model.

In order to solve the foregoing technical problem, the present application provides a classification model training method, the method including:
  determining sampling rates of first-class samples and second-class samples in a data set, and setting the samples with a sampling rate less than a preset value as target samples;
  determining data distribution feature information of the target samples based on Euclidean distances between all the samples in the data set, wherein the data distribution feature information is information describing the number of same-class samples in nearest neighbor samples, and the nearest neighbor samples are two samples at a Euclidean distance less than a preset distance;
  generating new samples corresponding to the target samples based on the data distribution feature information; and
  training the classification model using the first-class samples, the second-class samples and the new samples.

Optionally, the determining data distribution feature information of the target samples based on Euclidean distances between the target samples includes:
  calculating a superiority ratio between any two nearest neighbor target samples using a first formula, and determining the superiority ratio as the data distribution feature information, wherein the nearest neighbor target samples are two target samples at a Euclidean distance less than the preset distance;
  wherein the first formula is $Rat_{im}=Numx_i/Numx_{im}$, where $Rat_{im}$ is a superiority ratio between a sample $x_i$ and a sample $x_{im}$, $x_i$ is any sample in the target samples, $x_{im}$ is an m-th nearest neighbor sample in k same-class nearest neighbor samples of the sample $x_i$, $Numx_i$ is the number of target samples in k nearest neighbor samples of the sample $x_i$, and $Numx_{im}$ is the number of target samples in k nearest neighbor samples of the sample $x_{im}$.

Optionally, the generating new samples corresponding to the target samples based on the data distribution feature information includes:
  in case that the superiority ratio is less than 1, generating a new sample $x_{newim}$ corresponding to the target samples using a second formula, wherein the second formula is $x_{newim}=x_{im}+rand(0, 1)*Rat_{im}*(x_i-x_{im})$;
  in case that the superiority ratio is greater than 1, generating a new sample $x_{newim}$ corresponding to the target samples using a third formula, wherein the third formula is $x_{newim}=x_i+(rand(0, 1)/Rat_{im})*(x_{im}-x_i)$; and
  in case that the superiority ratio is equal to 1, generating a new sample $x_{newim}$ corresponding to the target samples using a fourth formula, wherein the fourth formula is $x_{newim}=x_i+rand(0, 1)*(x_{im}-x_i)$.

Optionally, the training the classification model using the first-class samples, the second-class samples and the new samples includes:
  performing a sampling operation on the first-class samples, the second-class samples and the new samples, and performing a training operation on the classification model based on the sampling result.

Optionally, the first-class samples are virus file samples, the second-class samples are non-virus file samples and the classification model is a file type detection model.

Optionally, after the performing a training operation on the classification model based on the sampling result, the method further includes:
  performing a detection operation on an unknown file using the trained file type detection model to generate a detection result, to determine whether the unknown file is a virus file based the detection result.

Optionally, determining sampling rates of first-class samples and second-class samples in the data set includes:
  determining the sampling rates of the first-class samples and second-class samples in the data set based on quantitative proportions of the samples in the data set.

The present application also provides a classification model training system, including:
  a target sample setting module, configured for determining sampling rates of first-class samples and second-class samples in a data set, and setting the samples with a sampling rate less than a preset value as target samples;
  a distribution feature determining module, configured for determining data distribution feature information of the target samples based on Euclidean distances between all the samples in the data set; wherein the data distribution feature information is information describing the number of same-class samples in nearest neighbor samples, and the nearest neighbor samples are two samples at a Euclidean distance less than a preset distance;

a new sample generating module, configured for generating new samples corresponding to the target samples based on the data distribution feature information; and a model training module, configured for training the classification model using the first-class samples, the second-class samples and the new samples.

The present application also provides a storage medium, having a computer program stored thereon which, when executed, implements the steps of the above classification model training method.

The present application also provides an electronic device, including a memory and a processor, wherein the memory has a computer program stored thereon; and the processor, when calling the computer program stored in the memory, implements the steps of the above classification model training method.

The present application provides a classification model training method, including: determining sampling rates of first-class samples and second-class samples in a data set, and setting the samples with a sampling rate less than a preset value as target samples; determining data distribution feature information of the target samples based on Euclidean distances between all the samples in the data set, wherein the data distribution feature information is information describing the number of same-class samples in nearest neighbor samples, and the nearest neighbor samples are two samples at a Euclidean distance less than a preset distance; generating new samples corresponding to the target samples based on the data distribution feature information; and training the classification model using the first-class samples, the second-class samples and the new samples.

According to the present application, the first-class samples or second-class samples with sampling rate less than the preset value are set as the target samples, the target samples being samples of a class accounting for a relatively small proportion in the data set. If the classification model is trained directly using the samples in the data set, the classification model would have a greater tendency to recognize a class accounting for a relatively large proportion in the data set, which affects the recognition effect. In the present application, the data distribution feature information of the target samples is determined based on the Euclidean distances between all the samples, and the new samples of the same class as the target samples are generated dynamically based on the data distribution feature information. As such, the numbers of the samples of each class in the data set are further balanced, and relatively poor model training effects caused by an unbalance between sample classes are avoided. It can be seen that, in the present application, the numbers of samples of various classes in the data set may be balanced, and the prediction accuracy of the classification model may be improved. The present application also provides a classification model training system, an electronic device and a storage medium, which have the foregoing beneficial effects. Elaborations are omitted herein.

BRIEF DESCRIPTION OF THE DRAWINGS

In order to describe the technical solutions in the embodiments of the present application or the conventional art more clearly, the drawings needed to be used in descriptions about the embodiments or the conventional art will be simply introduced below. It is apparent that the drawings described below are merely some embodiments of the present application. Other drawings may further be obtained by those of ordinary skill in the art according to these drawings without creative work.

DETAILED DESCRIPTION

In order to make the objective, technical solutions, and advantages of the embodiments of the present application clearer, the technical solutions in the embodiments of the present application will be described clearly and completely below in combination with the drawings in the embodiments of the present application.

Based on the embodiments of the present application, all other embodiments obtained by those skilled in the art without creative work shall fall within the protection scope of the present application.

Figure 1:
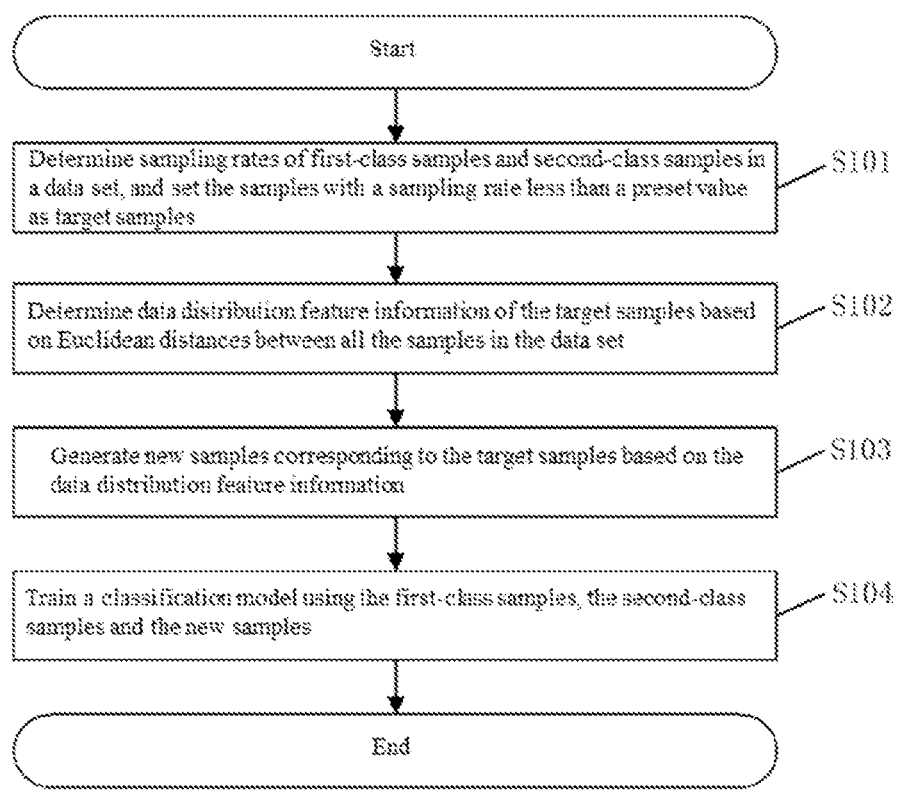
FIG. 1 is a flowchart of a classification model training method according to an embodiment of the present application.

References are made to FIG. 1 below. FIG. 1 is a flowchart of a classification model training method according to an embodiment of the present application.

The following specific steps may be included.

Step S101: determining sampling rates of first-class samples and second-class samples in a data set, and setting the samples with a sampling rate less than a preset value as target samples.

The data set mentioned in this step may include first-class samples and second-class samples. Specifically, the first-class samples may be positive samples, and the second-class samples may be negative samples. In the present embodiment, the sampling rates of the first-class samples and second-class samples in the data set may be determined based on quantitative proportions of the samples in the data set. Specifically, the sampling rate of the samples corresponding to a larger quantitative proportion is higher. It should be understood that the sampling rate is related to the number of the samples, as well as a parameter set for training the classification model.

In the present embodiment, the samples with a sampling rate less than the preset value are set as the target samples. For example, when the preset value is 1, the first-class samples are set as the target samples if the sampling rate of the first-class samples is less than 1, and the second-class samples are set as the target samples if the sampling rate of the second-class samples is less than 1. Certainly, the preset value may be set flexibly according to a practical application scenario, and no limits are made herein. This step aims to set the samples of a class accounting for a relatively small proportion in the data set as the target samples, thereby generating new samples of the same class in subsequent steps to further balance the proportions of the samples in the data set.

Step S102: determining data distribution feature information of the target samples based on Euclidean distances between the target samples.

Before this step, an operation of calculating the Euclidean distances between all the samples in the data set may be performed. Specifically, the Euclidean distances may include Euclidean distances between the first-class samples and Euclidean distances between the second-class samples, and may further include Euclidean distances between the first-class samples and the second-class samples. The Euclidean distances are Euclidean distances. A data distribution feature of the target samples may be obtained based on the Euclidean distances between all the samples. Here, the data distribution feature information is information describing the number of same-class samples in nearest neighbor samples, and the nearest neighbor samples are two samples at a Euclidean distance less than a preset distance. In the present embodiment, all samples at Euclidean distances less than a preset value from a certain sample are determined as nearest neighbor samples of the sample. Nearest neighbor samples of a sample may include samples of the same class, or samples of different classes.

Step S103: generating new samples corresponding to the target samples based on the data distribution feature information.

In the present embodiment, new samples corresponding to the target samples are generated based on the obtained data distribution feature information. Specifically, a region with a more densely target samples distribution has lower noise within the samples and less significant marginalization. Therefore, in the present embodiment, the new samples corresponding to the target samples may be generated in a densely target samples distribution, based on the data distribution feature. It should be understood that this step aims to generate the new samples based on the target samples accounting for a relatively small proportion in the data set to further balancing the numbers of the samples of each class in the data set. As a possible implementation, in the present embodiment, a corresponding number of new samples may be generated based on the difference between the sample numbers of the first-class samples and second-class samples in the data set, such that the first-class samples and the second-class samples are in a number balance state after the new samples are added to the data set. Specifically, the number balance state refers to a state that the difference between the sample numbers of the first-class samples and the second-class samples is within a preset range.

Step S104: training the classification model using the first-class samples, the second-class samples and the new samples.

Based on obtaining the new samples, in the present embodiment, the new samples may be added to the data set to further train the classification model using the samples in the data set. The classification model mentioned in the present embodiment may be a face recognition model, and furthermore, after a picture is input to the classification model, the classification model may determine whether the picture includes a face image. Alternatively, the classification model may be a virus detection model, and furthermore, after an unknown file is input to the classification model, the classification model may determine whether the unknown file is a virus file.

In the present embodiment, the first-class samples or second-class samples with sampling rate less than the preset value are set as the target samples, the target samples being samples of a class accounting for a relatively small proportion in the data set. If the classification model is trained directly using the samples in the data set, the classification model would have a greater tendency to recognize a class accounting for a relatively large proportion in the data set, which affects the recognition effect. In the present embodiment, the data distribution feature information of the target samples is determined based on the Euclidean distances between all the samples, and the new samples of the same class as the target samples are generated dynamically based on the data distribution feature information. As such, the numbers of the samples of each class in the data set are further balanced, and relatively poor model training effects caused by an unbalance between sample classes are avoided. It can be seen that, in the embodiments of present application, the numbers of samples of various classes in the data set may be balanced, and the prediction accuracy of the classification model may be improved.

As a further introduction to the embodiment corresponding to FIG. 1, the operation in S102 in the embodiment corresponding to FIG. 1 may specifically be implemented by calculating a superiority ratio between any two nearest neighbor target samples using a first formula, and determining the superiority ratio as the data distribution feature information. Here, the nearest neighbor target samples are two target samples at a Euclidean distance less than the preset distance, and the superiority ratio is information describing a superiority of a region between the pair of nearest neighbor target samples. In the present embodiment, the number of same-class samples within the preset distance from a specific sample is determined as an evaluation criterion of a superiority of a region. With a larger sample number, the region where the sample is located has a higher superiority. The region where the sample is located refers to all regional ranges within the preset distance from the sample. For example, there are 10 same-class nearest neighbor samples for sample A and 20 same-class nearest neighbor samples for sample B. In such case, it may be determined that a superiority of a region where sample B is located is higher than that of a region where sample A is located.

Specifically, the first formula is $Rat_{im}=Numx_i/Numx_{im}$, where $Rat_{im}$ is a superiority ratio between a sample $x_i$ and a sample $x_{im}$, $x_i$ is any sample in the target samples, $x_{im}$ is an m-th nearest neighbor sample in k same-class nearest neighbor samples of the sample $x_i$, $Numx_i$ is the number of target samples in k nearest neighbor samples of the sample $x_i$, and $Numx_{im}$ is the number of target samples in k nearest neighbor samples of the sample $x_{im}$.

If the method of determining the superiority ratio as the data distribution feature information is combined with the embodiment corresponding to FIG. 1, the operation for generating new samples in S103 in FIG. 1 may include the following steps.

in case that the superiority ratio is less than 1, generating a new sample $x_{newim}$ corresponding to the target samples using a second formula, wherein the second formula is $x_{newim}=x_{im}+rand(0, 1)*Rat_{im}*(x_i-x_{im})$;

in case that the superiority ratio is greater than 1, generating a new sample $x_{newim}$ corresponding to the target samples using a third formula, wherein the third formula is $x_{newim}=x_i+(rand(0, 1)/Rat_{im})*(x_{im}-x_i)$; and in case that the superiority ratio is equal to 1, generating a new sample $x_{newim}$ corresponding to the target samples using a fourth formula, wherein the fourth formula is $x_{newim}=x_i+rand(0, 1)*(x_{im}-x_i)$.

In the above-mentioned implementation, the new samples may be generated in a superior region based distribution features and tendency of the first-class samples and second-class samples in the data set, thereby further improving a training effect of the classification model. The Rand function refers to a uniform random real number more than or equal to 0 and less than 1 As a further introduction to the embodiment corresponding to FIG. 1, the operation for training the classification model in S104 may include: performing a sampling operation on the first-class samples, the second-class samples and the new samples, and performing a training operation on the classification model based on the sampling result.

Further, in the embodiment corresponding to FIG. 1, the first-class samples may be virus file samples, the second-class samples may be non-virus file samples, and the classification model may be a file type detection model. Correspondingly, after the training operation is performed on the file type detection model based on the sampling result, a detection operation may further be performed on an unknown file using a trained file type detection model to generate a detection result, to determine whether the unknown file is a virus file based on the detection result.

Figure 2:
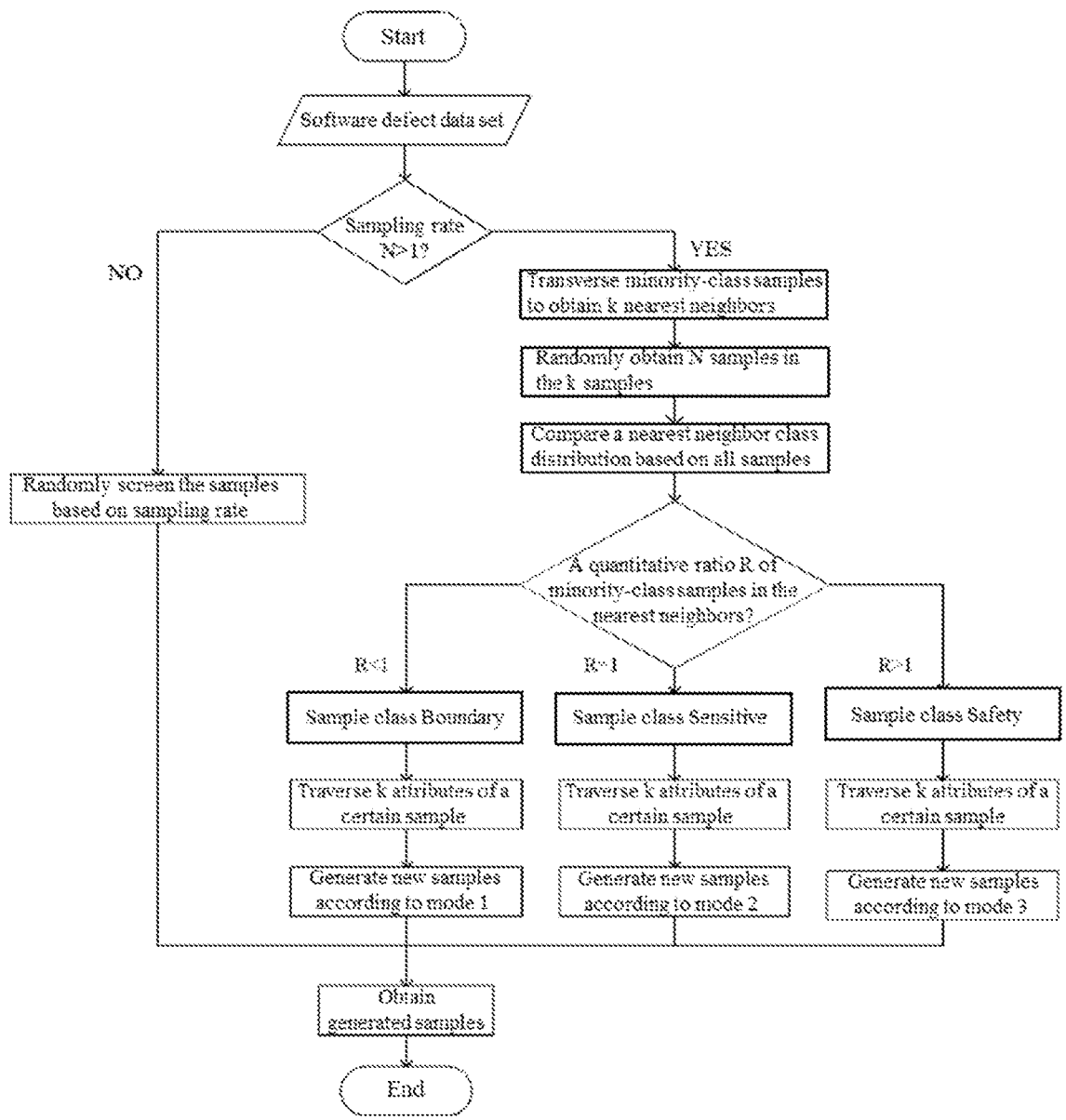
FIG. 2 is a flowchart of a method for sampling an unbalanced data set according to an embodiment of the present application.

The flow described in the above-mentioned embodiment will be described below with an embodiment in a practical application. Referring to FIG. 2, FIG. 2 is a flowchart of a method for sampling an unbalanced data set according to an embodiment of the present application. A method for sampling an unbalanced data set is described in the present embodiment. Minority-class samples are generated dynamically based on distribution features and sampling rates of unbalanced data as well as data distribution features of existing data sets. A sample generation mode is controlled to ensure that the new samples are generated in a superior region, thereby reducing sample marginalization aggravation and the probability that the new samples are noises.

In the present embodiment, a sample is classified and evaluated based on the region where the sample is located, and a proportion of same-class samples in k nearest neighbors of the sample is adopted as a classification standard. A new sample, when constructed, is inclined more to a sample corresponding to a larger proportion of same-class samples in the k nearest neighbor samples, thereby ensuring that the new sample is generated in a superior and more reasonable region. The basic idea of the present embodiment is as follows. k nearest neighbor samples of all minority-class samples are calculated. A quantitative proportion of same-class samples in the k nearest neighbor samples of each minority-class sample is statistically obtained as a standard for evaluating a superiority of the sample. k nearest neighbor samples in samples of the same class as the sample are statistically obtained. N samples are selected from the k nearest neighbor samples as auxiliary samples based on the sampling rate. Values of the sample and the auxiliary samples thereof are calculated, and each eigenvalue of a new sample is generated based on the values and a calculation rule, to obtain an additional sample by combination. The additional sample is added to the data set, to obtain a final balanced data set. Specifically, the present embodiment may include the following steps.

Step 1: Determining a Sampling Rate.

If the sampling rate N is less than or equal to 1, an original minority-class sample set is randomly sampled directly according to the sampling rate N, and a random sampling result is determined as an output result of a Tency-SMOTE algorithm. If the sampling rate N is greater than 1, the sampling rate is rounded, and the next step is performed.

Step 2: Calculating a Superiority of a Region where a Sample is Located.

The superiority of the region where the sample is located is determined based a proportion of same-class samples in k nearest neighbor samples of the sample. The superiority of the region where the sample is located is determined as follows.

For a sample $x_i$ of a minority class, $x_{im}$ represents a mt–h (m<=k) nearest neighbors in k same-class nearest neighbors of the sample $x_i$. $Numx_i$ represents the number of minority-class samples in the k nearest neighbor samples of the sample $x_i$ when two classes of samples are considered at the same time. $Numx_{im}$ represents the number of minority-class samples in k nearest neighbors of the sample $x_{im}$ when two classes of samples are considered at the same time. $x_{newim}$ represents a new sample extended according to the sample $x_i$ and the sample $x_{im}$. $Rat_{im}=Numx_i/Numx_{im}$ is defined as a superiority ratio between the sample $x_i$ and the sample $x_{im}$. $Ratx_{im}<1$ indicates that more minority-class samples are distributed around the sample $x_{im}$ than the sample $x_i$, namely a region where the sample $x_{im}$ is located is superior to that where the sample $x_i$ is located. Therefore, a superiority relationship between a certain sample and an auxiliary sample thereof is determined by a $Ratx_{im}$ value.

Step 3: Using Different Generation Strategies Based on Different Superiorities of the Region where the Sample is Located.

Figure 3:
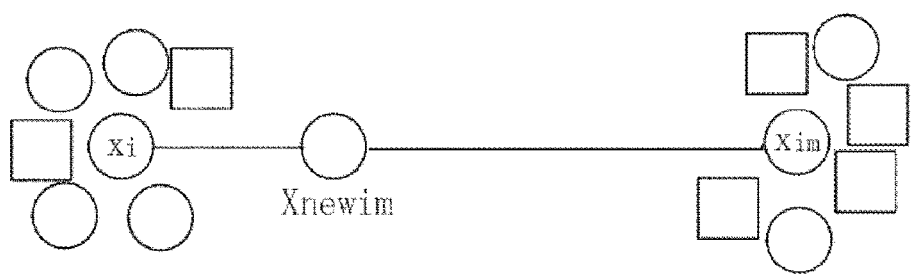
FIG. 3 is a schematic diagram of an inclination of a new sample according to an embodiment of the present application.

Based on the above definition, when a new sample is generated, the new sample is inclined more to the sample $x_{im}$ (or the region where $x_{im}$ is located). Referring to FIG. 3, FIG. 3 is a schematic diagram of an inclination of a new sample according to an embodiment of the present application.

For the sample $x_i$ and the nearest neighbor sample $x_{im}$ thereof, a proportion (or number) of minority-class samples in nearest neighbor samples of the sample $x_i$ is greater than that of negative-class samples in nearest neighbor samples of the sample $x_{im}$. Therefore, the newly generated sample $x_{newim}$ is inclined more to the sample $x_i$, to ensure that the new sample $x_{newim}$ is generated in a superior region. That is, in FIG. 3, the new sample $x_{newim}$ is at the left side of the straight line at a higher probability. That is, the following different new sample generation strategies are used according to a $Ratx_{im}$ value between a certain sample and an auxiliary sample thereof:

$$Xnew_{im} = \begin{cases} x_{im} + rand(0, 1) * Rat_{im} * (x_i - x_{im}) &, Rat_{im} < 1 \\ x_i + rand(0, 1)/Rat_{im} * (x_{im} - x_i) &, Rat_{im} > 1 \\ x_i + rand(0, 1) * (x_{im} - x_i) &, Rat_{im} = 1. \end{cases}$$

The above-mentioned sample generation method is analyzed below in detail.

(a) In case of $Ratx_{im}<1$, the sample $x_i$ may appear as a sample of a boundary class or a sensitive class. According to the principle that a new sample is in a superior minority-class region, the sample $x_{newim}$ newly extended in such case is inclined more to the sample $x_{im}$, namely:

$x_{newim}=x_{im}+\text{rand}(0,1)*Rat_{im}*(x_i-x_{im})$.

(b) The case that $Ratx_{im}$ is greater than 1 may occur to samples of the boundary class or the sensitive class. Similarly, the sample $x_{newim}$ newly generated in such case is inclined more to the sample $x_i$:

$x_{newim}=x_i+(\text{rand}(0,1)/Rat_{im})*(x_{im}-x_i)$.

(c) The case that $Ratx_{im}$ is equal to 1 may occur to samples of the boundary class and the sensitive class, and all safety classes satisfy this condition. Similarly, the sample $x_{newim}$ newly generated in such case is inclined equally to the sample $x_i$ and the sample $x_{im}$:

$$x_{newim}=x_i+\text{rand}(0,1)*(x_{im}-x_i).$$

It is to be noted that the above formulas are also original SMOTE algorithm formulas.

Step 4: Generating a New Sample Based on Different Strategies.

Feature attributes of a certain sample and an auxiliary sample thereof are sequentially traversed. Eigenvalues of a new sample are sequentially generated according to a certain strategy in the formula in step 2 to finally obtain the new sample.

Step 5: Completing Over-Sampling, and Ouputting a Sampling Result.

In the present embodiment, a data set to be subjected to data processing is obtained first, and dimensions and eigenvalue types of sample features thereof are statistically obtained. Minority-class sample points in the data set are traversed, and k nearest neighbor sample points of each minority-class sample are obtained. Here, the k nearest neighbor sample points of the sample are obtained based on eigenvalue balancing by a python data processing tool sklearn. N sample points are selected randomly as auxiliary samples according to sampling rates. $Ratx_{im}$ values between the sample point and the auxiliary sample points thereof are calculated respectively to determine an offset of a new sample. Each eigenvalue of the sample is obtained independently according to the $Ratx_{im}$ values. Then, each eigenvalue is combined to obtain an additional sample. Finally, all newly generated samples are added to the data set, thereby obtaining a final class-balanced data set. In the present embodiment, the problems of new sample distribution marginalization aggravation and noise increase in a conventional over-sampling method are solved, the reasonability of generating new samples in over-sampling is enhanced, and the accuracy, generalization ability, and other performance of the final model are improved.

Figure 4:
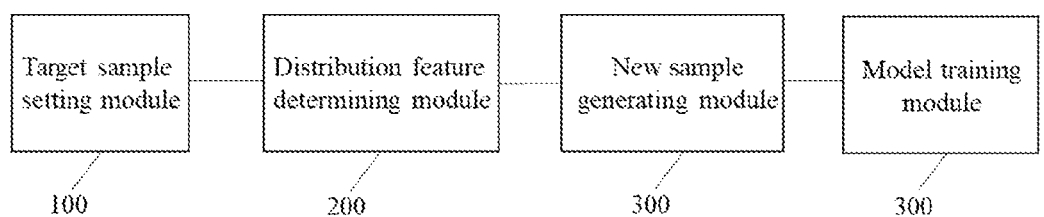
FIG. 4 is a schematic structural diagram of a classification model training system according to an embodiment of the present application.

Referring to FIG. 4, FIG. 4 is a schematic structural diagram of a classification model training system according to an embodiment of the present application.

The system may include:
a target sample setting module 100, configured for determining sampling rates of first-class samples and second-class samples in a data set, and setting the samples with a sampling rate less than a preset value as target samples;
a distribution feature determining module 200, configured for determining data distribution feature information of the target samples based on Euclidean distances between all the samples in the data set; wherein the data distribution feature information is information describing the number of same-class samples in nearest neighbor samples, and the nearest neighbor samples are two samples at a Euclidean distance less than a preset distance;
a new sample generating module 300, configured for generating new samples corresponding to the target samples based on the data distribution feature information; and
a model training module 400, configured for training the classification model using the first-class samples, the second-class samples and the new samples.

In the present embodiment, the first-class samples or second-class samples with sampling rate less than the preset value are set as the target samples, the target samples being samples of a class accounting for a relatively small proportion in the data set. If the classification model is trained directly using the samples in the data set, the classification model would have a greater tendency to recognize a class accounting for a relatively large proportion in the data set, which affects the recognition effect. In the present embodiment, the data distribution feature information of the target samples is determined based on the Euclidean distances between all the samples, and the new samples of the same class as the target samples are generated dynamically based on the data distribution feature information. As such, the numbers of the samples of each class in the data set are further balanced, and relatively poor model training effects caused by an unbalance between sample classes are avoided. It can be seen that, according to the embodiments of present application, the numbers of samples of various classes in the data set may be balanced, and the prediction accuracy of the classification model may be improved.

Further, the distribution feature determining module 200 is specifically configured for calculating a superiority ratio between any two nearest neighbor target samples using a first formula, and determining the superiority ratio as the data distribution feature information, wherein the nearest neighbor target samples are two target samples at a Euclidean distance less than the preset distance.

wherein the first formula is $Rat_{im}=Numx_i/Numx_{im}$, where $Rat_{im}$ is a superiority ratio between a sample $x_i$ and a sample $x_{im}$, $x_i$ is any sample in the target samples, $x_{im}$ is an m-th nearest neighbor sample in k same-class nearest neighbor samples of the sample $x_i$, $Numx_i$ is the number of target samples in k nearest neighbor samples of the sample $x_i$, and $Numx_{im}$ is the number of target samples in k nearest neighbor samples of the sample $x_{im}$.

Further, the new sample generating module 300 includes:
a first generation unit, configured for, in case that the superiority ratio is less than 1, generating a new sample $x_{newim}$ corresponding to the target samples using a second formula, wherein the second formula is $x_{newim}=x_{im}+\text{rand}(0, 1)*Rat_{im}*(x_i-x_{im})$;
a second generation unit, configured for, in case that the superiority ratio is greater than 1, generating a new sample $x_{newim}$ corresponding to the target samples using a third formula, wherein the third formula is $x_{newim}=x_i+(\text{rand}(0, 1)/Rat_{im})*(x_{im}-x_i)$; and
a third generation unit, configured for, in case that the superiority ratio is equal to 1, generating a new sample $x_{newim}$ corresponding to the target samples using a fourth formula, wherein the fourth formula is $x_{newim}=x_i+\text{rand}(0, 1)*(x_{im}-x_i)$.

Further, the model training module 400 is specifically configured for performing a sampling operation on the first-class samples, the second-class samples and the new samples, and performing a training operation on the classification model according to a sampling result.

Further, the first-class samples are virus file samples, the second-class samples are non-virus file samples and the classification model is a file type detection model.

Further, the system further includes:
a virus detection module configured for, after the performing a training operation on the classification model according to a sampling result, performing a detection operation on an unknown file using the trained file type detection model to generate a detection result, to determine whether the unknown file is a virus file based the detection result.

Further, the target sample setting module 100 includes:

a sampling rate determining unit, configured for determining the sampling rates of the first-class samples and second-class samples in the data set based on quantitative proportions of the samples in the data set.

The embodiment of the system part is in mutual correspondence with the embodiment of the method part. Therefore, the embodiment of the system part refers to the descriptions about the embodiment of the method part, and will not be elaborated temporarily herein.

The present application also provides a storage medium, having a computer program stored thereon which, when executed, may implement the steps provided in the above-mentioned embodiment. The storage medium may include various media capable of storing program codes such as a U disk, a mobile hard disk, a Read-Only Memory (ROM), a Random Access Memory (RAM), a magnetic disk, or an optical disk.

The present application also provides an electronic device, which may include a memory and a processor. The memory stores a computer program. The processor, when calling the computer program in the memory, may implement the steps provided in the above-mentioned embodiment. Certainly, the electronic device may further include various network interfaces, a power supply, and other components.

All the embodiments in this specification are described in a progressive manner. Contents mainly described in each embodiment are different from those described in other embodiments. Same or similar parts of all the embodiments refer to each other. For the system disclosed in the embodiments, since it corresponds to the method disclosed in the embodiments, the description is relatively simple, and the relevant part can be referred to the description of the method part. It should be noted that for a person of ordinary skill in the art, several improvements and modifications can be made to the present application without departing from the principle of the present application, and these improvements and modifications also fall within the scope of protection of the claims of the present application.

It is also noted that in this specification, relationship terms such as first and second are used only to distinguish one entity or operation from another entity or operation, without necessarily requiring or implying any such actual relationship or order between those entities or operations. Further, the terms "include" "comprise" or any other variation thereof are intended to cover non-exclusive inclusion, such that a process, method, article, or apparatus that includes a set of elements includes not only those elements, but also other elements not expressly listed, or also include elements that are inherent to such process, method, article, or apparatus. With no more restrictions, an element defined by statement "including a/an" does not exclude the existence of the same other elements in a process, method, object, or device including the element.

The invention claimed is:

1. A classification model training method, comprising:
determining sampling rates of first-class samples and second-class samples in a data set, and setting the first-class samples and the second-class samples with a sampling rate less than a preset value as target samples;
determining data distribution feature information of the target samples based on Euclidean distances between all the first-class samples and the second-class samples in the data set, wherein the data distribution feature information is information describing a number of same-class samples in nearest neighbor samples, and the nearest neighbor samples are two samples at a Euclidean distance less than a preset distance;
generating new samples corresponding to the target samples based on the data distribution feature information; and
training the classification model using the first-class samples, the second-class samples and the new samples;
wherein the determining data distribution feature information of the target samples based on Euclidean distances between all the first-class samples and the second-class samples in the data set comprises:
calculating a superiority ratio between any two nearest neighbor target samples using a first formula, and determining the superiority ratio as the data distribution feature information, wherein the two nearest neighbor target samples are two target samples at a Euclidean distance less than the preset distance;
wherein the first formula is $Rat_{im}=Numx_i/Numx_{im}$, where $Rat_{im}$ is a superiority ratio between a sample $x_i$ and a sample $x_{im}$, $x_i$ is any sample in the target samples, $x_{im}$ is an m-th nearest neighbor sample in k same-class nearest neighbor samples of the sample $x_i$, $Numx_i$ is a number of target samples in k nearest neighbor samples of the sample $x_i$, and $Numx_{im}$ is a number of target samples in k nearest neighbor samples of the sample $x_{im}$; and
wherein the generating new samples corresponding to the target samples based on the data distribution feature information comprises:
in case that the superiority ratio is less than 1, generating a new sample $x_{newim}$ corresponding to the target samples using a second formula, wherein the second formula is $x_{newim}=x_{im}+rand(0, 1)*Rat_{im}*(x_i-x_{im})$;
in case that the superiority ratio is greater than 1, generating a new sample $x_{newim}$ corresponding to the target samples using a third formula, wherein the third formula is $x_{newim}=x_i+(rand(0, 1)/Rat_{im})*(x_{im}-x_i)$; and
in case that the superiority ratio is equal to 1, generating a new sample $x_{newim}$ corresponding to the target samples using a fourth formula, wherein the fourth formula is $x_{newim}=x_i+rand(0, 1)*(x_{im}-x_i)$.

2. The classification model training method of claim 1, wherein the training the classification model using the first-class samples, the second-class samples and the new samples comprises:
performing a sampling operation on the first-class samples, the second-class samples and the new samples to obtain a sampling result, and performing a training operation on the classification model based on the sampling result to obtain a trained file type detection model.

3. The classification model training method of claim 2, wherein the first-class samples are virus file samples, the second-class samples are non-virus file samples and the classification model is a file type detection model.

4. The classification model training method of claim 3, wherein after the performing a training operation on the classification model based on the sampling result, the method further comprises:
performing a detection operation on an unknown file using the trained file type detection model to generate a detection result, to determine whether the unknown file is a virus file based the detection result.

5. The classification model training method of claim 1, wherein the determining sampling rates of first-class samples and second-class samples in a data set comprises:
  determining the sampling rates of the first-class samples and the second-class samples in the data set based on quantitative proportions of the first-class samples and the second-class samples in the data set.

6. An electronic device, comprising a memory and a processor, wherein the memory has a computer program stored thereon; and the processor, when calling the computer program stored in the memory, implements a classification model training method, comprising:
  determining sampling rates of first-class samples and second-class samples in a data set, and setting the first-class samples and the second-class samples with a sampling rate less than a preset value as target samples;
  determining data distribution feature information of the target samples based on Euclidean distances between all the first-class samples and the second-class samples in the data set, wherein the data distribution feature information is information describing a number of same-class samples in nearest neighbor samples, and the nearest neighbor samples are two samples at a Euclidean distance less than a preset distance;
  generating new samples corresponding to the target samples based on the data distribution feature information; and
  training the classification model using the first-class samples, the second-class samples and the new samples;
  wherein the determining data distribution feature information of the target samples based on Euclidean distances between all the first-class samples and the second-class samples in the data set comprises:
    calculating a superiority ratio between any two nearest neighbor target samples using a first formula, and determining the superiority ratio as the data distribution feature information, wherein the two nearest neighbor target samples are two target samples at a Euclidean distance less than the preset distance;
  wherein the first formula is $Rat_{im} = Numx_i / Numx_{im}$, where $Rat_{im}$ is a superiority ratio between a sample $x_i$ and a sample $x_{im}$, $x_i$ is any sample in the target samples, $x_{im}$ is an m-th nearest neighbor sample in k same-class nearest neighbor samples of the sample $x_i$, $Numx_i$ is a number of target samples in k nearest neighbor samples of the sample $x_i$, and $Numx_{im}$ is a number of target samples in k nearest neighbor samples of the sample $x_{im}$; and
  wherein the generating new samples corresponding to the target samples based on the data distribution feature information comprises:
    in case that the superiority ratio is less than 1, generating a new sample $x_{newim}$ corresponding to the target samples using a second formula, wherein the second formula is $x_{newim} = x_{im} + rand(0, 1) * Rat_{im} * (x_i - x_{im})$;
    in case that the superiority ratio is greater than 1, generating a new sample $x_{newim}$ corresponding to the target samples using a third formula, wherein the third formula is $x_{newim} = x_i + (rand(0, 1)/Rat_{im}) * (x_{im} - x_i)$; and
    in case that the superiority ratio is equal to 1, generating a new sample $x_{newim}$ corresponding to the target samples using a fourth formula, wherein the fourth formula is $x_{newim} = x_i + rand(0, 1) * (x_{im} - x_i)$.

7. The electronic device of claim 6, wherein the training the classification model using the first-class samples, the second-class samples and the new samples comprises:
  performing a sampling operation on the first-class samples, the second-class samples and the new samples to obtain a sampling result, and performing a training operation on the classification model based on the sampling result to obtain a trained file type detection model.

8. The electronic device of claim 7, wherein the first-class samples are virus file samples, the second-class samples are non-virus file samples and the classification model is a file type detection model.

9. The electronic device of claim 8, wherein after the performing a training operation on the classification model based on the sampling result, the method further comprises:
  performing a detection operation on an unknown file using the trained file type detection model to generate a detection result, to determine whether the unknown file is a virus file based the detection result.

10. A non-transitory storage medium, having computer-executable instructions stored thereon, wherein the computer-executable instructions, when loaded and executed by a processor, implements a classification model training method, comprising:
  determining sampling rates of first-class samples and second-class samples in a data set, and setting the first-class samples and the second-class samples with a sampling rate less than a preset value as target samples;
  determining data distribution feature information of the target samples based on Euclidean distances between all the first-class samples and the second-class samples in the data set, wherein the data distribution feature information is information describing a number of same-class samples in nearest neighbor samples, and the nearest neighbor samples are two samples at a Euclidean distance less than a preset distance;
  generating new samples corresponding to the target samples based on the data distribution feature information; and
  training the classification model using the first-class samples, the second-class samples and the new samples;
  wherein the determining data distribution feature information of the target samples based on Euclidean distances between all the first-class samples and the second-class samples in the data set comprises:
    calculating a superiority ratio between any two nearest neighbor target samples using a first formula, and determining the superiority ratio as the data distribution feature information, wherein the two nearest neighbor target samples are two target samples at a Euclidean distance less than the preset distance;
  wherein the first formula is $Rat_{im} = Numx_i / Numx_{im}$, where $Rat_{im}$ is a superiority ratio between a sample $x_i$ and a sample $x_{im}$, $x_i$ is any sample in the target samples, $x_{im}$ is an m-th nearest neighbor sample in k same-class nearest neighbor samples of the sample $x_i$, $Numx_i$ is a number of target samples in k nearest neighbor samples of the sample $x_i$, and $Numx_{im}$ is a number of target samples in k nearest neighbor samples of the sample $x_{im}$; and
  wherein the generating new samples corresponding to the target samples based on the data distribution feature information comprises:
    in case that the superiority ratio is less than 1, generating a new sample $x_{newim}$ corresponding to the target samples using a second formula, wherein the second formula is $x_{newim} = x_{im} + \text{rand}(0, 1) * \text{Rat}_{im} * (x_i - x_{im})$;

in case that the superiority ratio is greater than 1, generating a new sample $x_{newim}$ corresponding to the target samples using a third formula, wherein the third formula is $x_{newim} = x_i + (\text{rand}(0, 1)/\text{Rat}_{im}) * (x_{im} - x_i)$; and in case that the superiority ratio is equal to 1, generating a new sample $x_{newim}$ corresponding to the target samples using a fourth formula, wherein the fourth formula is $x_{newim} = x_i + \text{rand}(0, 1) * (x_{im} - x_i)$.

11. The non-transitory storage medium of claim 10, wherein the training the classification model using the first-class samples, the second-class samples and the new samples comprises:

performing a sampling operation on the first-class samples, the second-class samples and the new samples to obtain a sampling result, and performing a training operation on the classification model based on the sampling result to obtain a trained file type detection model.

12. The non-transitory storage medium of claim 11, wherein the first-class samples are virus file samples, the second-class samples are non-virus file samples and the classification model is a file type detection model.

13. The non-transitory storage medium of claim 12, wherein after the performing a training operation on the classification model based on the sampling result, the method further comprises:

performing a detection operation on an unknown file using the trained file type detection model to generate a detection result, to determine whether the unknown file is a virus file based the detection result.

* * * * *